United States Patent Office 3,391,063
Patented July 2, 1968

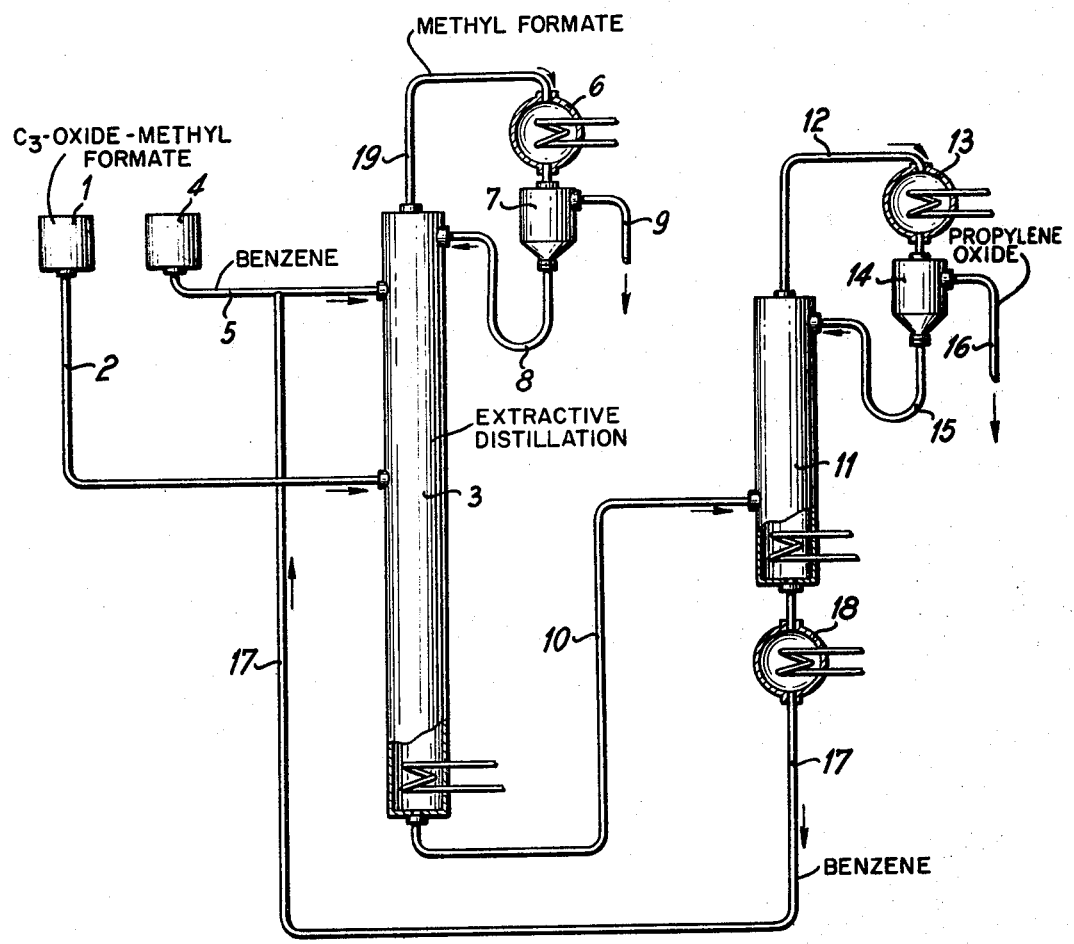

3,391,063
PLURAL DISTILLATION FOR PURIFYING PROPYLENE OXIDE CONTAMINATED WITH METHYL FORMATE
Kurt Sennewald, Knapsack, near Cologne, Heinz Erpenbach, Surth, near Cologne, and Wilhelm Vogt, Knapsack, near Cologne, Germany, assignors to Knapsack Aktiengesellschaft, Knapsack, near Cologne, Germany, a corporation of Germany
Filed Nov. 19, 1965, Ser. No. 508,696
Claims priority, application Germany, Dec. 4, 1964, K 54,700
3 Claims. (Cl. 203—69)

ABSTRACT OF THE DISCLOSURE

Purification of propylene oxide contaminated with methyl formate by adding n-pentane to the contaminated propylene oxide and fractionally distilling the mixture or by scrubbing vapors of the contaminated propylene oxide with liquid benzene whereby the propylene oxide is dissolved in the benzene and fractionally distilling the resulting benzene mixture to recover substantially pure propylene oxide.

---

The present invention relates to a process for purifying propylene oxide contaminated with methyl formate by extractive distillation.

It is known that propylene oxide can be prepared by epoxidizing propylene in the liquid phase, e.g., with a percarboxylic acid or another peroxidic compound or with air in the presence of an oxidation catalyst with the resultant formation of reaction mixtures which in addition to propylene oxide also contain as by products methanol, higher alcohols, acetaldehyde, formic acid, methyl formate and acetic acid as well as acetic acid esters of low or high molecular weight. The propylene oxide is generally isolated from the above mixtures by fractional distillation wherein propylene oxide is obtained together with methyl formate as a homogeneous fraction due to the slight difference of 2° C. in the boiling point of these two compounds. Distillative separation of this binary mixture with the goal to obtain propylene oxide cannot be achieved under economical conditions. In the process disclosed in U.S. specification No. 3,071,601 it is therefore proposed to add n-pentane as a distillation auxiliary to the mixture to be separated, and to separate from the propylene oxide the methyl formate together with n-pentane in the form of a readily boiling azeotrope having a boiling point of 22° C. The remaining distillation residue comprising a mixture of propylene oxide with n-pentane, which also has a constant boiling point of 28° C., must be subjected to special purifying treatment to isolate the propylene oxide. Although the addition of n-pentane to the propylene oxide/methyl formate mixture results in the initial boiling point difference being increased from 2° C. to 6° C. and in conditions more favorable for distillative separation, it is clear that this proposed process must be termed expensive and commercially uninteresting.

The present invention, however, enables propylene oxide contaminated with methyl formate to be purified by a technically simple process and with relatively low expenditure by extractive distillation with benzene resulting in the formation of propylene oxide having a purity, e.g., of 99.95%, i.e. a purity sufficient for polymerizing the propylene oxide.

The process of the present invention for purifying propylene oxide contaminated with methyl formate comprises more especially scrubbing in counter-current manner contaminated propylene oxide in vapor form with at least about six times the amount by volume of benzene, related to the amount of propylene oxide to be purified, so as to separate the propylene oxide, subjecting the resulting benzenic solution to fractional distillation to separate pure propylene oxide, removing methyl formate vapors not dissolved in the benzene and liquefying them by cooling.

For removing the propylene oxide from the vapor mixture by scrubbing, it is advantageous to use about 6–12 times the amount by volume of benzene, related to the amount of liquid propylene oxide to be purified.

The propylene oxide can be purified in continuous operation, wherein benzene, such as recovered during the purifying distillation of propylene oxide, is continuously recycled to the scrubbing stage of contaminated propylene oxide. For continuous operation, the benzene is more especially introduced into the upper portion and the contaminated propylene oxide is introduced approximately into the center portion of a distilling column, of which the sump portion is maintained at a temperature of about 75° C., methyl formate is removed overhead at a temperature of about 33° C., whereas a benzenic solution of propylene oxide is removed from the sump portion and subjected to fractional distillation, and the benzene is recycled to the distilling column for further use as an extractant.

The starting product used in the process of the present invention contains methyl formate most frequently in a proportion of up to about 5% by weight, and the purified propylene oxide ultimately obtained has a purity of more than 99%. A content of less than 5% by weight in the starting material does not affect the degree of purity obtainable although removal of contaminants present in a concentration lower than, e.g., about 1% by weight is often difficult to achieve and incomplete.

As compared with conventional methods which due to the low difference in boiling point of the mixture components, imply using a fractionating column warranting good separation, the present process permits carrying out the extractive distillation and the following purifying distillation of propylene oxide in a customary distilling column provided with a customary number of trays, while recovering and cycling the extractant add to the economy of the process.

An exemplary mode of executing the process of the present invention in continuous operation is shown in the accompanying flow scheme. In accordance therewith propylene oxide contaminated with methyl formate is caused to travel from reservoir 1 through line 2 into the center portion of a heated distilling column 3 provided with bubble trays, and evaporated therein. Vapors ascending in column 3 are scrubbed in counter-current manner with at least 6 times the molar amount of benzene, related to the amount of propylene oxide used, the benzene being caused to travel from container 4 through line 5 into the upper portion of column 3 and a benzenic solution of propylene oxide being obtained in the sump portion of column 3. Almost pure methyl formate in vapor form is removed at the head of column 3 through line 19, liquefied in cooler 6 and collected in separator 7. A portion of the methyl formate obtained in separator 7 is refluxed through line 8 into column 3, whereas the balance portion can be withdrawn through line 9. The product obtained in the bottom portion of column 3 is conveyed through line 10 to fractionating column 11 in which the propylene oxide is distilled to obtain it in pure form. Propylene oxide having a purity greater than 99% is removed at the head of column 11 through line 12, liquefied in cooler 13 and collected in separator 14. A portion of the condensed matter obtained in separator 14 is refluxed through line 15 into column 11, whereas purified propylene oxide can be removed through discharge line 16. Benzene such as obtained in the sump portion of column 11 is first cooled in cooler 18 and then recycled through cycle line 17 into column 3 for further use.

EXAMPLE 1

100 cc. of a mixture consisting of 95% by weight propylene oxide and 5% by weight methyl formate were supplied, per hour, onto the 25th tray in column 3 which was provided with 45 trays, and evaporated at a temperature of 75° C. prevailing in the still portion of the column. The vapor mixture ascending in the column was scrubbed with 1200 cc. benzene, supplied within the same period of time onto the 40th tray of column 3. Methyl formate in vapor form, which contained a maximum of 1% by weight of the propylene oxide used, was removed at a temperature of 33° C. at the head of column 3, then liquefied and collected in separator 7. A portion of the methyl formate obtained, which corresponded to a reflux ratio of at least 20, was refluxed into column 3, whilst the balance portion thereof was withdrawn through line 9. For separating the propylene oxide, the benzenic solution of propylene oxide, obtained in the sump of column 3, was supplied to the 6th tray of column 11 provided with 21 bubble trays, and subjected therein to fractional distillation at a temperature of 82° C. prevailing in the still portion. To improve the separating effect, a portion of the propylene oxide, escaping at the head of column 11 at a temperature of 34° C., corresponding to a reflux ratio of 5, was refluxed into column 11, whilst the balance portion thereof was withdrawn from separator 14 through line 16. The purified propylene oxide had a purity of 99.95% and thus met the specifications for polymerization. Benzene such as obtained in the sump portion of column 11 was first cooled down to a temperature of 20° C. and then supplied through cycle line 17 to the 40th tray of column 3.

EXAMPLE 2

100 cc. of a mixture consisting of 99.3% by weight propylene oxide and 0.7% by weight methyl formate were purified, per hour, in a manner analogous to that described in Example 1. Methyl formate such as withdrawn at the head of column 3 contained as a contaminant about 1.5% by weight of the amount of propylene oxide used, whereas the propylene oxide purified in column 11 had a purity of 99.98%.

We claim:
1. A process for purifying propylene oxide contaminated with 1 to 5% by weight of methyl formate in a continuous operation, which comprises introducing the contaminated propylene oxide into a heated distillation column and evaporating the same, the vapors ascending in the column, scrubbing in counter-current manner the contaminated propylene oxide ascending vapors with at least about six times the amount by volume of benzene, related to the amount of propylene oxide to be purified, so as to separate the propylene oxide as a benzenic-propylene oxide sump portion with methyl formate being removed as overhead, subjecting the resulting benzenic-propylene oxide sump portion to fractionating distillation in a fractionating column to separate pure propylene oxide therefrom as overhead, liquifying the propylene oxide and methyl formate by cooling and returning the benzene from the fractionating column to the distillation column as reflux.

2. A process as claimed in claim 1, wherein about 6–12 times the amount by volume of benzene, related to the amount of liquid propylene oxide to be purified, is used for scrubbing.

3. A process as claimed in claim 1, wherein for continuous operation the benzene is introduced into the upper portion and the contaminated propylene oxide is introduced approximately into the center portion of a distilling column, of which the sump portion is maintained at a temperature of about 75° C., methyl formate is removed overhead at a temperature of about 33° C., whereas a benzenic solution of propylene oxide is removed from the sump portion and subjected to fractional distillation, and the benzene is recycled to the distilling column for further use as an extractant.

References Cited

UNITED STATES PATENTS

| | | | |
|---|---|---|---|
| 2,710,829 | 6/1955 | Michael | 203—44 |
| 2,903,465 | 9/1959 | Suter et al. | 203—69 X |
| 3,039,940 | 6/1962 | Prinz et al. | 260—348 X |
| 3,105,019 | 9/1963 | Murray et al. | 203—68 X |
| 3,293,154 | 12/1966 | Newton | 203—68 X |

NORMAN YUDKOFF, *Primary Examiner.*

F. E. DRUMMOND, *Assistant Examiner.*